United States Patent [19]

Gupta et al.

[11] Patent Number: 5,073,273

[45] Date of Patent: Dec. 17, 1991

[54] TREATMENT OF AZIDE CONTAINING WASTE

[75] Inventors: Raj K. Gupta, Moorpark; Morton L. Kraft, La Palma, both of Calif.; William B. Coleman, Mesa, Ariz.

[73] Assignee: TRW Vehicle Safety Systems, Inc., Lyndhurst, Ohio

[21] Appl. No.: 703,910

[22] Filed: May 22, 1991

[51] Int. Cl.$^5$ .............................................. C02F 1/78
[52] U.S. Cl. ................................. 210/760; 210/766; 210/900; 210/903
[58] Field of Search .............. 210/900, 760, 761, 753, 210/903, 766; 423/395

[56] References Cited

U.S. PATENT DOCUMENTS

| | | | |
|---|---|---|---|
| 4,412,924 | 11/1983 | Feather | 210/760 |
| 4,584,107 | 4/1986 | Odaka et al. | 210/760 |
| 4,632,766 | 12/1986 | Firnhaber et al. | 210/760 |
| 4,654,144 | 3/1987 | Sharkey et al. | 210/631 |

OTHER PUBLICATIONS

The Publication "Energetic Materials", Edited by H. D. Fair and R. F. Walker, Plenum Press, New York (1977), vol. 2, Chapter 3 Entitled Handling, Storability, and Destruction of Azides.

*Primary Examiner*—Stanley S. Silverman
*Assistant Examiner*—Cynthia L. Nessler
*Attorney, Agent, or Firm*—Tarolli, Sundheim & Covell

[57] ABSTRACT

A process for treating a gas generating material waste containing an alkali metal azide comprising the steps of preparing an alkaline aqueous solution containing the waste, treating the alkaline aqueous solution with a gaseous stream of ozone under conditions effective to oxidize the alkali metal azide to nitrogen and alkali metal nitrate, and then recovering the nitrate.

11 Claims, No Drawings

TREATMENT OF AZIDE CONTAINING WASTE

BACKGROUND OF THE INVENTION

1. Technical Field

The present invention relates to a method of treating an azide-containing waste and, more particularly, to a method of treating a waste which contains an ignitable mixture of an alkali metal azide and an oxidant.

2. Description of the Prior Art

Alkali metal azides are used in the manufacture of gas generating material for inflatable vehicle occupant restraints, such as air bags. The alkali metal azides are mixed with other ingredients, including reactants for the alkali metal azides. Common reactants for the alkali metal azides are a metal oxide, such as iron oxide or copper oxide, and a water-soluble oxidant, such as sodium nitrate The mixture of ingredients is formed into a gas generating material. When ignited, the gas generating material produces nitrogen gas.

The gas generating material may be formed into gas generating grains as shown in U.S. Pat. No. 4,817,828. The grains may also contain ingredients, such as carbon fibers, which impart mechanical strength to the grains, and bentonite, which functions as an extrusion aid in forming the grains.

The gas generating grains are susceptible to fracture from handling, shipping and storage. When fractured, the grains are unsuitable for use in a vehicle occupant restraint. The fractured grains thus become solid waste.

One method of manufacturing the gas generating grains involves wet blending the ingredients. When the equipment used to wet blend the ingredients is cleaned, a liquid waste containing the ingredients is generated.

Alkali metal azides are expensive. Therefore, attempts have been made to recover a substantial amount of the azides from the solid and/or liquid waste. This involves the use of separation equipment to separate the azides from the other ingredients of the waste. However, during this recovery, an effluent is obtained which will contain some residual azide. The effluent will also contain other ingredients, such as a metal oxide. Thus, the effluent may be capable of combustion and is unsuitable for landfill or sewer disposal.

The publication "Energetic Materials", Plenum Press, New York (1977), Volume 2, Chapter 3, entitled "Handling, Storability and Destruction of Azides", discloses several procedures for the disposal of waste containing an alkali metal azide. One approach involves burning the waste in a large incinerator or open pit. The azide decomposes leaving behind a residue of oxides of the alkali metal. These oxides can react with water to form alkali metal hydroxide. The alkali metal hydroxide is in concentrated form and must be neutralized with an acid and then removed from insoluble solids in the residue by filtering, prior to disposal, all adding to the cost of disposal. Also, incineration or open pit burning can generate hazardous gaseous by-products, such as active oxides of the sodium metal and oxides of nitrogen.

The publication also discloses disposal of an azide-containing waste by neutralizing the azide with an acidified solution of sodium nitrite ($NaNO_2$) and water. The problem with this process is that hydrazoic acid fumes ($HN_3$) can be generated during the neutralization reaction. Hydrazoic acid fumes are explosive and highly toxic in very small concentrations (for instance 100 parts per billion in air). In addition, other toxic fumes, such as nitrous oxide ($N_2O$), can be generated in the neutralization reaction.

SUMMARY OF THE INVENTION

The present invention resides in the discovery that a waste containing an alkali metal azide can be treated by preparing an alkaline aqueous slurry containing the azide, and treating the alkaline aqueous slurry with a gaseous stream of ozone under conditions effective to oxidize the alkali metal azide to alkali metal nitrate. The alkali metal nitrate may be recovered for disposal or other use. Preferably, the alkaline aqueous slurry containing the alkali metal azide is basic and has a pH of at least about 8. By carrying out the ozonation with the alkaline aqueous slurry basic, the formation of hydrazoic acid ($HN_3$) is prevented.

The present invention is particularly applicable to treating an alkali metal azide waste which contains, in addition to an alkali metal azide, an oxidizing agent which is reactable with the azide and, when mixed with the azide, forms an ignitable mixture. Typically, such an oxidizing agent is a metal oxide which is insoluble in water. When the waste contains water insoluble ingredients in addition to the alkali metal azide, the alkaline aqueous slurry preferably is filtered prior to and/or subsequent to ozonation. The filtration recovers the water insoluble ingredients from the slurry before the recovery of the alkali metal nitrate.

DESCRIPTION OF A PREFERRED EMBODIMENT

U.S. Pat. No. 4,817,828, assigned to the assignee of the present application, discloses a gas generating grain containing an alkali metal azide. A plurality of gas generating grains are placed in an inflator assembly for a vehicle occupant restraint, such as an air bag. The air bag has a normal inactive condition in which the air bag is collapsed. When a vehicle in which the air bag is mounted becomes involved in a collision, the air bag is inflated from its collapsed condition. Inflation of the air bag occurs by a rapid flow of gas from the inflator assembly caused by ignition of the gas generating grains. When the air bag is inflated, it is effective to restrain movement of an occupant of the vehicle and it prevents an occupant from violently contacting structural parts of the vehicle interior.

The gas generating grains are made of a composition which includes an alkali metal azide and at least one oxidant which is reactive with the azide. Examples of alkali metal azides which can be used are sodium, potassium and lithium azide. Sodium azide is the preferred alkali metal azide. A preferred oxidant is a metal oxide. The metal of the metal oxide may be any metal lower in the electromotive series than the alkali metal. Examples of preferred metals are iron, copper, manganese, tin, titanium, nickel, and combinations thereof. The preferred oxidant is an iron oxide, such as ferric oxide, or copper oxide.

The composition of the gas generating grains may also comprise a water soluble oxidant such as an alkali metal nitrate, chlorate, and/or perchlorate, or combinations of the foregoing. Sodium nitrate is the preferred water soluble oxidant.

Relatively small amounts of an extrusion aid and strengthening fibers may also be provided in the composition of the gas generating grains. Bentonite is a preferred extrusion aid. Graphite fibers are a preferred strengthening fiber.

By way of example, the composition of the gas generating grains may contain the following ingredients:

| Ingredient | Amount |
|---|---|
| Sodium azide (NaN$_3$) | 48%–68% |
| Iron oxide (Fe$_2$O$_3$) | 25%–45% |
| Graphite fibers | 0%–6% |
| Bentonite | 0%–5% |
| Sodium Nitrate (NaNO$_3$) | 0%–10% |

It should be understood that the composition of the gas generating grains can be different than the specific composition set forth above. For instance, an alkali metal azide other than sodium azide can be used. Also, a different metal oxide can be used and/or a different oxidant can be used. Fibers other than graphite fibers, such as glass fibers and iron fibers, can be used for mechanical reinforcement of the gas generating grains.

As disclosed in U.S. Pat. No. 4,817,828, the gas generating grains preferably are cylindrically shaped. The grains are pressed into the cylindrical shape. The grains are susceptible to fracture from handling, storage and shipment. The grains, when fractured, are unsuitable for use in an inflator for a vehicle occupant restraint, and thus become a solid waste product.

A waste product can also be generated at any of a number of processing steps in the manufacture of the gas generating grains. Depending upon the step, the waste can be in a liquid form or in a solid form. During the manufacture of the gas generating grains, many ingredients of the gas generating material may be mixed together in water. Thus, an aqueous waste can be generated. Also, an aqueous waste can be generated from the cleaning of conduits, vessels and other equipment used in making the gas generating material. Further, an aqueous waste can be generated from washing any sludge formed in any of the several processing steps.

Certain steps in the manufacture of the gas generating grains may be carried out in a dry environment. Waste in the form of particles of azide-containing material can result from these steps. Dry azide-containing waste can also be generated during the assembly of gas generating grains into an occupant restraint. Other sources of azide-containing waste, either dry or in an aqueous liquid form, will be apparent to those skilled in the art.

In the process of the present invention, the waste, in either a dry form or in an aqueous liquid form, is introduced into a reaction vessel. Water is added to the reaction vessel to provide an amount of water effective to dissolve all of the azide and other water soluble ingredients in the waste. The vessel and waste are preferably at room temperature.

If the waste is in the form of relatively large, dry particles, the waste preferably is ground or milled to a smaller particle size prior to introducing the waste into the reaction vessel. This makes the water soluble ingredients of the waste more readily soluble. By way of example, the waste may be reduced to a maximum particle size of about 2 mm. Size reduction can be carried out in any suitable size reduction apparatus.

Typically, the waste within the reaction vessel will be in a slurry form, containing water insoluble ingredients such as a metal oxide, in addition to water soluble ingredients. Any azide, such as sodium azide, is alkaline, so that the solution of water, azide and water soluble oxidant (such as nitrate), if present, will be at least slightly basic, having a pH above about 8. Preferably, the pH of the solution is above about 9. If necessary, the slurry in the reaction vessel can be treated with a base, such as sodium hydroxide, to increase the alkalinity of the mixture. A preferred pH for the slurry in the reaction vessel is in the range of 9–11. At this pH, the formation of hydrazoic acid (HN$_3$) and hydrazoic acid vapors is prevented.

The reaction vessel preferably has a bottom inlet for introducing ozone into the vessel from an ozone generator. The reaction vessel also preferably has baffles within the vessel which provide a means for dispersing the ozone introduced into the vessel throughout the water and azide containing waste mixture. Prior to ozonation, and during ozonation if necessary, the mixture of water and waste may be agitated to prevent settling or phase separation of ingredients of the mixture.

Generally, the ozone generator will produce an ozone/air mixture. A typical volume ratio of ozone to air is about 1.2:100. The ozonation can be carried out on a batch basis or continuous basis.

The ozonation is carried out until the azide is converted substantially completely to nitrate, nitrogen gas, and sodium ions in the water, in accordance with the following equations:

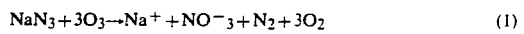
$$NaN_3 + 3O_3 \rightarrow Na^+ + NO_3^- + N_2 + 3O_2 \tag{1}$$

$$2NaN_3 + O_3 + H_2O \rightarrow 2Na^+ + 2OH^- + O_2 + 3N_2 \tag{2}$$

There is no criticality in the rate of addition of ozone to the azide containing slurry in the reaction vessel, or in the length of time the ozonation is carried out, except that the ozonation should be carried out until all of the nitrogen in the sodium azide is converted to nitrate ions (NO$_3^-$) and nitrogen (N$_2$). Also, the solution will contain sodium ions and hydroxyl ions. This will occur, by way of example, in a period of about one-half hour.

Prior to or following ozonation, the slurry may be filtered to remove any water insoluble material in the slurry, such as metal oxide. If filtered from the slurry following ozonation, the metal oxide solids are suitable for disposal to a landfill. The filtrate which contains NaNO$_3$ and sodium hydroxide can be discarded to a sewer. Alternatively, the filtrate can be treated, for instance by drying, to evaporate the water from the sodium nitrate. By evaporating the water from the sodium nitrate, the sodium nitrate is reclaimed and can be reused in the process for manufacturing the gas generating material. The sodium hydroxide will crystallize with the sodium nitrate in the drying step. The amount of sodium hydroxide is insufficient to prevent use of the reclaimed sodium nitrate in the manufacture of gas generating material. In fact, in a wet process for the manufacture of gas generating material, a pH of about 10 is desirable to prevent the generation of hydrazoic acid, and the presence of the sodium hydroxide thus is beneficial.

Example 1

A dry waste of solid gas generating material reduced to a maximum particle size of about two millimeters was added to water in the ratio of about 0.2 grams waste to about 100 milliliters of water. The amount of water was effective to dissolve the water soluble components of the waste. The waste was a conventional nitrogen generating composition comprising, on a weight basis: about 57.5% sodium azide; about 2% sodium nitrate; about 35% iron oxide; about 3% graphite fibers; and about 2.5% bentonite. Ingredients such as iron oxide, graphite fibers, and bentonite were insoluble in the water. The resulting dispersion had a solution pH of about 8.2. The dispersion was introduced into a reaction vessel having a bottom inlet for adding ozone into the vessel and a plurality of baffles to disperse the ozone through the azide water mixture. An ozone generator was connected to the ozone inlet of the vessel and an ozone/oxygen mixture was fed into the vessel in the amount of about 1.2:100 volume ratio of ozone to air. The rate of flow of ozone/oxygen mixture was about 200 milliliters per minute per 100 milliliters of water, for thirty minutes.

The dispersion, after ozone treatment, was filtered and a filtrate sample was analyzed by ion chromatography for azide and nitrate ion concentrations. No azide was detected in the filtrate sample. The chromatogram showed a large peak for nitrate. The results indicated that approximately 12% of the total sodium azide in the mixture was oxidized to nitrate ions. The remaining sodium azide (about 88%) was oxidized into nitrogen and sodium ions. The pH of the filtrate was about 11.5.

Example 2

This Example illustrates the treatment of a solid azide waste to recover azide from the waste prior to treating a residual slurry by ozonation. The waste has the same composition as in Example 1. The waste is first reduced to a maximum particle size of about 2 mm. An aqueous slurry of the waste is then prepared adding sufficient water to dissolve the water soluble ingredients of the waste, e.g., azide and nitrate. The slurry is subjected to centrifuge separation to separate the water insoluble ingredients, e.g., ferric oxide or cupric oxide, from the solution of azide and nitrate. Residual fines are separated from the solution in a membrane type polishing filter. The metal oxides and other water insoluble ingredients can be recycled for making additional gas generating material The solution is then subjected to crystallization in a crystallizer. If the solution contains sodium nitrate, fractional crystallization can be carried out to produce a sodium nitrate purge stream. Sodium azide crystals are separated from the solution, and then dried, for instance to a moisture content of about 0.4% by weight. This makes the azide crystals suitable for reuse or reprocessing to make additional gas generating material. The mother liquor, from which the azide crystals and purge stream of sodium nitrate (if present) are separated, contains some residual metal oxide and other water insoluble ingredients, some dissolved and crystallized azide, and some dissolved and crystallized nitrate. The mother liquor can be reslurried and subjected to a second centrifuge separation and azide crystallization to recover additional azide. The mother liquor is then reslurried again and treated by ozonation as in Example 1 for destruction of residual azide in the mother liquor.

Following ozonation, the liquor is centrifuged to recover additional metal oxides, free of azides. The remaining liquor is then suitable for sewer disposal. Alternatively, the mother liquor following ozonation can be disposed of in a landfill without centrifuge treatment.

From the above description of preferred embodiments of the invention, those skilled in the art will perceive improvements, changes and modifications. Such improvements, changes and modifications within the skill of the art are intended to be covered by the appended claims.

Having described specific preferred embodiments of the invention, the following is claimed:

1. A process for the treatment of a waste containing an azide having he formula $XN_3$, where X is an alkali metal, comprising the steps of:
preparing an alkaline aqueous slurry containing said alkali metal azide; and
treating said alkaline aqueous slurry with a gaseous stream of ozone under conditions effective to oxidize the alkali metal azide to nitrogen and an alkali metal nitrate.

2. The process of claim 1 wherein said waste also contains water insoluble solids, and further including the step of separating said water insoluble solids from the alkali metal nitrate after ozonation.

3. The process of claim 2 wherein said water insoluble solids comprise a metal oxide.

4. The process of claim 3 wherein said waste is a composition comprising sodium azide, sodium nitrate and iron oxide.

5. The process of claim 3 further including the step of recovering said water insoluble solids.

6. The process of claim 3 wherein the nitrate is recovered by evaporation of water therefrom.

7. The process of claim 1 wherein said alkaline aqueous slurry has a pH more than about 8.

8. The process of claim 1 wherein said waste is a gas generating material containing an alkali metal azide and a metal oxide.

9. The process of claim 8 wherein said alkali metal azide is sodium azide and said metal oxide is iron oxide or copper oxide.

10. The process of claim 8 wherein the waste contains a water soluble oxidant.

11. A process for treating a gas generating material waste which contains an azide having the formula $XN_3$, where X is an alkali metal, and a water insoluble metal oxide reactable with said azide, comprising the steps of:
preparing an aqueous slurry containing said waste and having a pH more than about 9;
treating said aqueous slurry with a gaseous stream containing oxygen and ozone for a time, and with an amount of ozone, effective to oxidize said azide to nitrogen and nitrate ions in solution; and
separating said metal oxide from said solution.

* * * * *

UNITED STATES PATENT AND TRADEMARK OFFICE
CERTIFICATE OF CORRECTION

PATENT NO. : 5,073,273

DATED : December 17, 1991

INVENTOR(S) : Raj K. Gupta, Morton L. Kraft and William B. Coleman

It is certified that error appears in the above-identified patent and that said Letters Patent is hereby corrected as shown below:

Column 6, Line 16, Claim 1, change "he" to --the--.

Signed and Sealed this

Twenty-seventh Day of April, 1993

*Attest:*

MICHAEL K. KIRK

*Attesting Officer*     Acting Commissioner of Patents and Trademarks